United States Patent [19]

Stoll et al.

[11] Patent Number: 5,497,253
[45] Date of Patent: Mar. 5, 1996

[54] MULTI-LAYER OPTO-ELECTRONIC NEURAL NETWORK

[75] Inventors: Harold M. Stoll, Rancho Palos Verdes; James J. Reis, Mountain View, both of Calif.

[73] Assignee: Northrop Grumman Corporation, Los Angeles, Calif.

[21] Appl. No.: 99,882

[22] Filed: Jul. 30, 1993

Related U.S. Application Data

[63] Continuation-in-part of Ser. No. 811,589, Dec. 20, 1991, Pat. No. 5,235,439, which is a continuation-in-part of Ser. No. 562,294, Aug. 3, 1990, Pat. No. 5,099,434, which is a continuation-in-part of Ser. No. 220,769, Jul. 18, 1988, abandoned.

[51] Int. Cl.$^6$ .............................. G03H 1/16; G02B 27/46
[52] U.S. Cl. .................... 359/29; 359/4; 359/11; 359/559; 359/561; 382/156; 382/159
[58] Field of Search ................................ 359/4, 7, 11, 29, 359/559, 560, 561; 382/14, 15, 155, 156, 157, 159, 37

[56] References Cited

U.S. PATENT DOCUMENTS

| | | | |
|---|---|---|---|
| 3,995,948 | 12/1976 | Abe et al. | 359/29 |
| 4,949,389 | 8/1990 | Allebach et al. | 382/31 |
| 5,028,102 | 7/1991 | Ogura et al. | 359/4 |
| 5,121,228 | 6/1992 | Paek | 359/7 |
| 5,129,041 | 7/1992 | Pernick et al. | 359/11 |
| 5,132,813 | 7/1992 | Caulfield et al. | 359/11 |
| 5,220,618 | 6/1993 | Sirat et al. | 382/157 |
| 5,235,439 | 8/1993 | Stoll | 359/7 |
| 5,235,440 | 8/1993 | Clark et al. | 359/11 |
| 5,293,456 | 3/1994 | Guez et al. | 382/159 |
| 5,317,651 | 5/1994 | Refregier et al. | 382/31 |
| 5,323,472 | 6/1994 | Falk | 359/29 |

OTHER PUBLICATIONS

D. A. Gregory and H. K. Liu, "Large–Memory Real–Time Multichannel Multiplexed Pattern Recognition", *Applied Optics* 23/24, pp. 4560–4570, 15 Dec. 1984.
T. Jannson, et al., "The Interconnectability of Neuro–Optic Processors", SPIE, vol. 698, pp. 157–169, 1986.
D. L. Staeber, et al., "Multiple Storage and Erasure of Fixed Holograms in Fe–Doped LiNbo$_3$" *Applied Physics Letters*, vol. 26, No. 4, pp. 182–184, 15 Feb. 1975.

(List continued on next page.)

*Primary Examiner*—Paul M. Dzierzynski
*Assistant Examiner*—John Juba, Jr.
*Attorney, Agent, or Firm*—Terry J. Anderson; Karl J. Hoch, Jr.

[57] ABSTRACT

A pattern recognition apparatus and a method for operating same. The apparatus includes a volume holographic medium (4) having a plurality of Fourier-space volume holograms representing pattern templates stored within. The apparatus further includes a spatial light modulator (1) and a phase encoder (2). The phase encoder has an output optically coupled to the medium by a first Fourier transform lens (3). The spatial light modulator spatially modulates a spatially uniform laser beam (7) in accordance with an unknown pattern. The two-dimensional phase encoder causes the spatially modulated laser beam to be spatially distributed prior to application to the medium. The apparatus also includes a detector (6, 11) having an input optically coupled by a second Fourier transform lens (5) means to an angular spectrum of plane waves generated by the medium in response to the output of the spatial modulator, phase encoder, and first Fourier lens. The detector detects plane waves that correspond to vector inner products generated within medium (4) in response to the unknown pattern. The apparatus further contains a means (12) for nonlinearly processing the output of detector (6, 11) and a means (13) by which the output of nonlinear processing means (12) may be temporarily stored.

14 Claims, 8 Drawing Sheets

OTHER PUBLICATIONS

C. N. Kurtz, "Transmittance Characteristics of Surface Diffusers and the Design of Nearly Band-Limited Binary Diffusers", *J. Opt. Soc. Amer.,* vol. 62, No. 8, pp. 982–989, Aug. 1972.

Gabor, "Character Recognition By Holography", *Nature,* 208, pp. 422–423, 1965.

J. T. LaMacchia and D. L. White, "Coded Multiple Exposure Holograms", *Applied Optics,* 7, pp. 91–94, Jan. 1968.

J. R. Leger and Sing H. Lee, "Hybrid Optical Processor For Pattern Recognition and Classification Using A Generalized Set Of Pattern Functions", *Applied Optics,* 21, pp. 274–287, 15 Jan. 1982.

MULTI-LAYER OPTO-ELECTRONIC NEURAL NETWORK

CROSS-REFERENCE TO RELATED PATENT APPLICATION

This patent application is a continuation-in-part of U.S. patent application Ser. No. 07/811,589, filed Dec. 20, 1991, entitled "Volume-Holographic Inner Product Processor" now U.S. Pat. No. 5,235,439, which is a continuation-in-part of U.S. patent application Ser. No. 07/562,294 filed 3 Aug. 1990, entitled "Continuous-Time Optical Neural Network," by H. M. Stoll et al., now U.S. Pat. No. 5,099,434, which is a continuation-in-part of Ser. No. 07/220,769, filed Jul. 18, 1988, entitled "Optical Neural Network", by H. M. Stoll et al., now abandoned each of which is assigned to the assignee of record herein.

BACKGROUND OF THE INVENTION

Multi-layer neural networks may be used to classify patterns. These networks typically consist of layers of non-linear processing elements (or "neurons") arranged in a highly interconnected hierarchy. Each neuron within the top layer of the network hierarchy accepts as input a weighted sum over all of the resolution elements of the pattern to be classified. Each of these sums is then nonlinearly processed by each top-layer neuron and outputted to the second layer of the network, in which each neuron accepts as input a weighted sum over all neural outputs of the first layer. This process continues until the output, or classification, layer of the network is reached. The outputs of this layer are then interpreted as the desired classification results. Typically, no more than two or three layers are required to achieve pattern classification and typically the number of neurons in each layer decreases as the classification layer is approached. The network is trained to classify patterns by pre-selecting the weights that interconnect the various layers. A good theoretical description of multi-layer neural networks may be found in *Parallel Distributed Processing: Explorations in the Microstructure of Cognition*, Vol. 1: Foundations, by D. E. Rumelhart and J. L. McClelland (MIT Press, 1986).

Mathematically, the functioning of a single layer of a multi-layer neural network may be described as follows:

$$\vec{g}[R^{(i)}\vec{\sigma}_{(i)}] = \vec{g}[\vec{f}^{(i)}] = \vec{\sigma}^{(i+1)}; i=1,2,\ldots,N, \quad (1)$$

where the pattern vector $\vec{\sigma}^{(i)}$ is the input to layer "i"; the matrix $R^{(i)}$ represents the neuron input weights; N is the number of network layers; and $\vec{g}[\cdot]$ is a nonlinear vector function which operates identically on each element of $\vec{f}^{(i)}$.

Typically, $\vec{g}[\cdot]$ operates on each element "k" of $\vec{f}^{(i)}$ as indicated in FIG. 1. The particular nonlinear transfer function illustrated in FIG. 1 has what is commonly referred to as a sigmoidal shape, with adjustable threshold ("a") and saturation ("b") points.

FIG. 2 shows an illustrative example of a three-layer neural network consisting of a three-resolution-element input pattern with two output classes. Each layer consists of a fully interconnected set of weights connecting the input to the summers. The output from the summers is fed through a nonlinearity, which completes the processing for that layer. The output from one layer serves as input to the next layer.

Pattern classification problems in which input patterns are two-dimensional images typically require two-layer neural networks which may contain as many as $10^2$ classification-layer neurons and $10^3$ input-layer neurons. For a $10^4$-pixel image and fully interconnected layers, $R^{(1)}$ becomes a $10^4 \times 10^3$-element matrix and $R^{(2)}$ a $10^3 \times 10^2$-element matrix. Real-time ($\sim 10^3$ seconds) classification of unknown images therefore requires on the order of twenty billion operations per second [$=2\times(10^7+10^5)\times10^3$]. Existing, all-digital electronic computers capable of such throughput occupy many cubic feet of volume and consume thousands of watts of power.

Optical devices in which the matrices $R^{(i)}$ may be stored in the form of two-dimensional Fourier-space holograms include those described by: D. Gabor in "Character Recognition by Holography" in *Nature*, 208, p.422 (1965); J. T. LaMacchia and D. L. White in "Coded Multiple Exposure Holograms", *Applied Optics*, 7, p.91 (1968); J. R. Leger and S. H. Lee in "Hybrid Optical Processor for Pattern Recognition and Classification Using a Generalized Set of Pattern Functions", *Applied Optics*, 21, p.274 (1982); and D. A. Gregory and H. K. Liu in "Large-Memory Real-Time Multi-channel Multiplexed Pattern Recognition", *Applied Optics*, 23, p.4560 (1984). Additionally, in a paper by T. Jannson, H. M. Stoll, and C. Karaguleff ("The interconnectability of neuro-optic processors", Proceedings of the International Society for Optical Engineering, Vol. 698, p. 157 (1986)), there is described, on page 162, an optical volume-holographic architecture for computing matrix-vector products. This disclosure is, however, in the context of providing interconnects for an all-optical, recurrent (feedback)-type neural network.

It is one object of this invention to provide a method and apparatus that employs a three-dimensional volume holographic medium in which multi-layer, opto-electronic neural network interconnects are stored and used to multiply pattern vectors.

It is another object of this invention to provide nonlinear processing means by which the intermediate and output pattern vectors computed within a multi-layer, opto-electronic neural network may be acted upon.

It is a further object of this invention to provide a compact (potentially less than 200 cubic inches), low-power (potentially less than 10 watts of prime electrical power), multi-layer, opto-electronic neural network capable of executing at least $2\times10^{10}$ (twenty billion) arithmetic operations per second.

SUMMARY OF THE INVENTION

In accordance with the invention, a multi-layer neural network accepts as input a pattern vector $\vec{\sigma}^{(1)}$ and returns as output a classification vector $\vec{\sigma}^{(N)}$. All $\vec{\sigma}^{(i)}$ (i=1,2,...,N−1) are assigned pre-determined portions of the network input transducer, which consists of a two-dimensional spatial light modulator (SLM) mounted onto or in close proximity to a two-dimensional phase encoder (diffuser) having the same transverse dimensions. Neural network weight matrices, $R^{(i)}$, are stored in the form of three-dimensional, Fourier-space holograms, with each hologram corresponding to a single row of an individual $R^{(i)}$. These rows are referred to hereafter as weight vectors. All weight vectors of a given $R^{(i)}$ are accessed simultaneously (in parallel) by illuminating the volume holograms with the Fourier transform of the pattern or input vector, $\vec{\sigma}^{(i)}$, which is to be weighted (or multiplied) by the $R^{(i)}$ in question. Elements of the product vectors $\vec{f}^{(i)}$ (inner products between the weight vectors and $\vec{\sigma}^{(i)}$ are determined by measuring the properties of the light radiated by the volume holograms: the angle of each of the light rays radiated indexes the element (i.e., indicates which weight vector is being multiplied or dotted onto the input vector $\vec{\sigma}^{(i)}$) while the amplitude of each of the light rays radiated is proportional to the square of the magnitude of the indexed inner product. Nonlinear processing of the individual elements of the product vector, $\vec{f}^{(i)}$, is accomplished by focusing each radiated light ray onto a detector array element and further processing the detector array output using, for example, an electronic look-up table or a saturable electronic amplifier with adjustable thresholding and saturation points. The non-linearly processed $\vec{\sigma}^{(i)}$ (equal to $\vec{\sigma}^{(i+1)}$ is then temporarily held in an electronic buffer memory prior to being loaded into that portion of the SLM allocated to layer "i+1". This procedure is continued until $\vec{\sigma}^{(N)}$ is produced.

In addition to providing computational throughputs far in excess of available or projected all-digital electronic neural networks, the present invention enables more weight-vector information (the product of weight-vector count and weight-vector size) to be accessed in parallel than do the aforementioned devices, wherein weight vectors are stored in the form of two-dimensional Fourier-space holograms. The ratio of storage capacities (storage capacity of a three-dimensional-hologram device divided by the storage capacity of a two-dimensional-hologram device) is equal to the maximum (linear) space-bandwidth product, or number of linearly ordered resolution elements, that can be achieved in an optical system. The latter number is typically on the order of 3,000.

More specifically, the invention provides a pattern classification apparatus and a method for operating same. The apparatus includes a volume-holographic medium having a plurality of Fourier-space volume holograms representing stored weight vectors. The apparatus further includes a spatial light modulator and a phase encoder. The phase encoder has an output optically coupled to the volume-holographic medium by a first Fourier transform lens. The spatial light modulator spatially modulates a spatially uniform laser beam in accordance with an unknown pattern which has been loaded into the spatial light modulator. The two-dimensional phase encoder causes the spatially modulated laser beam to be spatially distributed prior to application to the volume-holographic medium. The apparatus also includes a detector having an input optically coupled by a second Fourier transform lens means to an angular spectrum of plane waves generated by the volume-holographic medium in response to the output of the spatial modulator, phase encoders and first Fourier lens. The detector detects focused plane waves that correspond to vector inner products generated within the volume-holographic medium in response to the unknown pattern vector. The apparatus further includes a nonlinear electronic device for serially processing the detected inner products, means for temporarily storing the nonlinearly processed inner products, and means for feeding the nonlinearly processed inner products back into the spatial light modulator.

BRIEF DESCRIPTION OF THE DRAWINGS

The above set forth and other features of the invention are made more apparent in the ensuing Detailed Description of the Invention, when read in conjunction with the attached drawings, wherein.

DETAILED DESCRIPTION OF THE INVENTION

The Multi-Layer Opto-Electronic Neural Network (MLOENN) classifies patterns by repeatedly executing the algorithm described by Equation (1). This algorithm consists of: (1) calculating the matrix-vector product $R^{(i)}\vec{\sigma}_{(i)}$ to yield $\vec{f}^{(i)}$ and (2) nonlinearly processing $\vec{f}^{(i)}$ to yield $\vec{\sigma}^{(i+1)}$ which then becomes the input to the next network layer. The network is virtual in the sense that only one layer actually "exists" at a time: intermediate results (i.e., $\vec{\sigma}^{(i)}$ for $i$>1) are temporarily stored in a buffer memory prior to being fed back into the MLOENN for further processing.

The MLOENN calculates $R^{(i)}\vec{\sigma}_{(i)}$ by computing, in parallel, the inner products between the rows of $R^{(i)}$ (hereafter referred to as weight vectors) and $\vec{\sigma}^{(i)}$. Mathematically, the MLOENN calculates:

$$\vec{v}^{(k,i)} \cdot \vec{\sigma}^{(i)} = f_k^{(i)}; k=1,2,\ldots, K, \qquad (2)$$

where $\vec{v}^{(k,i)}$ is the (transpose) of the $k^{th}$ row of $R^{(i)}$, $f_k^{(i)}$ is the $k^{th}$ element of $\vec{f}^{(i)}$, and K is the number of rows of $R^{(i)}$. $\vec{\sigma}^{(i)}$ is a lexicographic representation of the input pattern $\sigma^{(i)}$ (or intermediate neural network result being processed), wherein each resolution element or pixel of $\sigma^{(i)}$ corresponds to a specific element of $\vec{\sigma}^{(i)}$.

Figure 1:
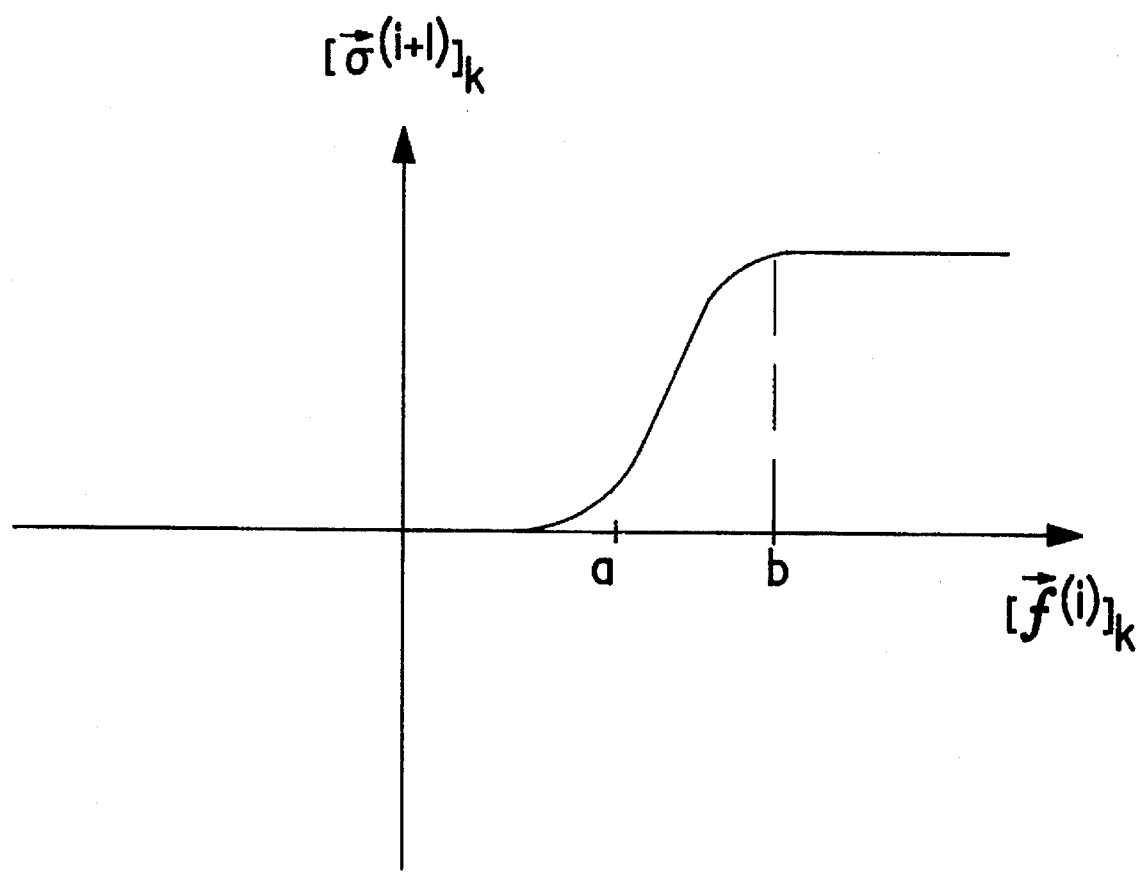
FIG. 1 depicts nonlinear processing of element "k" of the neural input vector, $[\vec{f}^{(i)}]_k$, to produce a corresponding element of the neural output vector, $[\vec{\sigma}^{(i+1)}]_k$. "a" and "b" are thresholding and saturation points, respectively, of the resulting sigmoidal neural transfer function.
Figure 2:
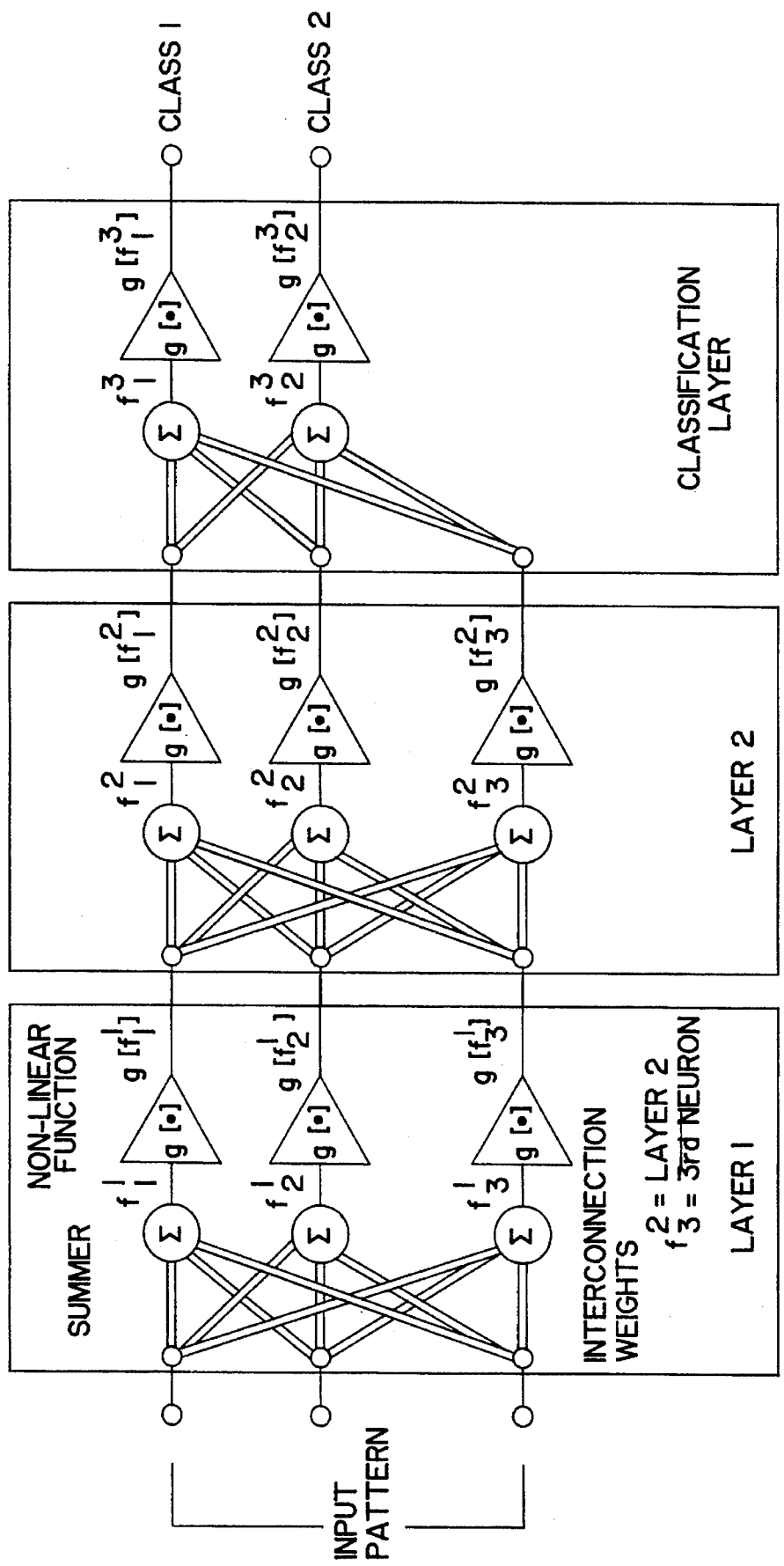
FIG. 2 schematically depicts an example of a three-layer neural network.

The MLOENN nonlinearly processes the $f_k^{(i)}$ by serially passing the latter through any electronic device with an appropriate, nonlinear transfer function (as illustrated by the example shown in FIG. 1).

Figure 3:
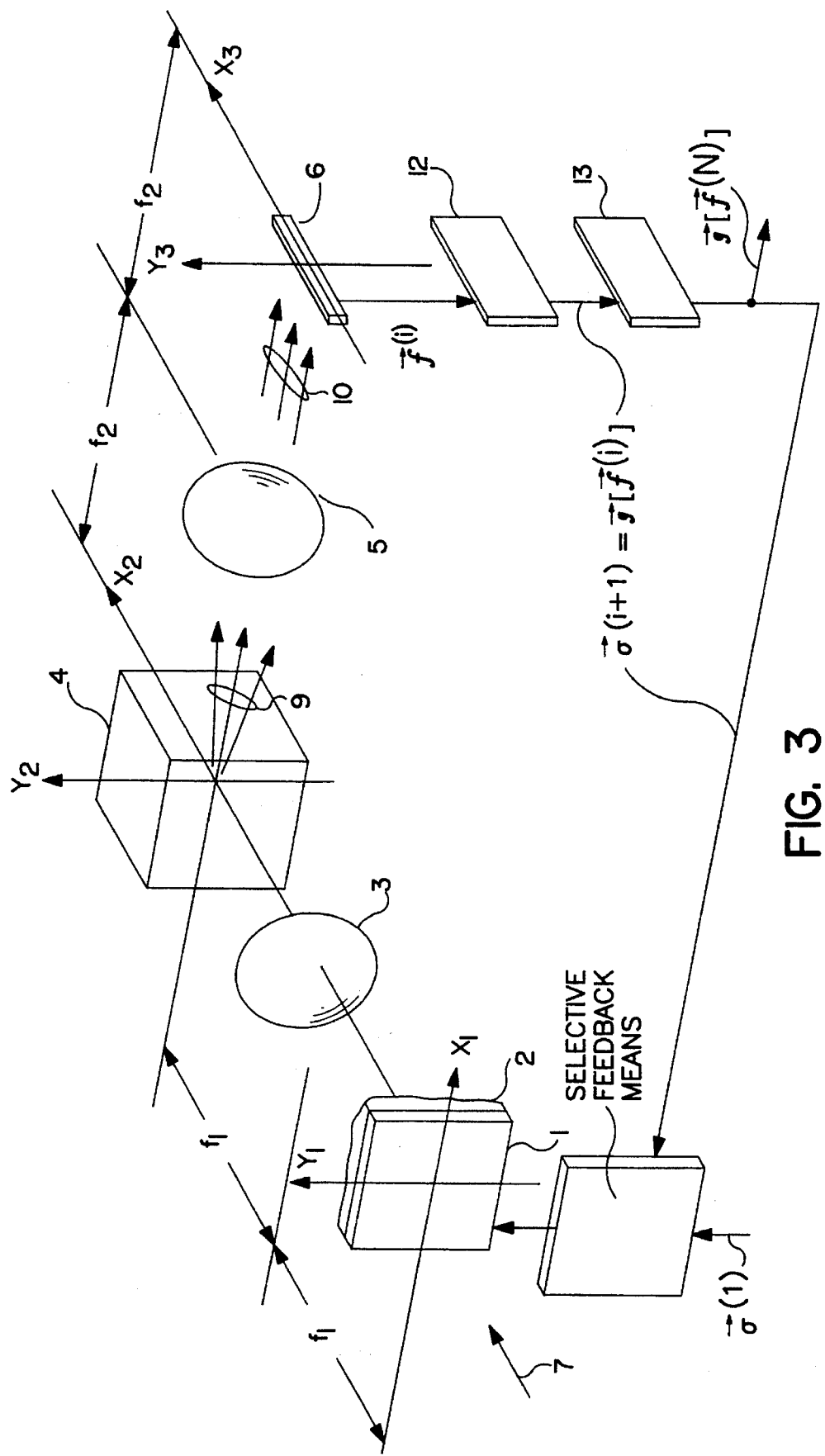
FIGS. 3 is a perspective drawing of a multi-layer opto-electronic neural network (MLOENN) of the invention.

A perspective illustration of the MLOENN is shown in FIG. 3. The MLOENN includes a two-dimensional spatial light modulator (SLM) 1, a two-dimensional phase encoder 2, a first Fourier transform lens 3, a medium 4 in which volume holograms are stored, a second Fourier transform lens 5, a linear detector array 6, a nonlinear processing device 12, a buffer memory 13, Rays 9 represent plane waves generated within medium 4 (having amplitudes $f_k^{(i)}$, k=1,2, ..., K) and rays 10 represent waves (also having amplitudes $f_k^{(i)}$, k=1,2, ..., K) convergent (i.e., focused) on detector 6. With reference to Equation (1), $\vec{\sigma}^{(i+1)}$ represents the input pattern to be classified, $\vec{g}[\vec{f}(N)]$ represents the ultimate classification result, and $\vec{\sigma}^{(i+1)}$ represents an intermediate layer (i= 1,2, ..., N−1) pattern vector. Nonlinear processing device 12 processes each of the $f_k^{(i)}$ sequentially to generate (also sequentially) the $\sigma_k^{(i+1)}$ according to Equation (1). The $\sigma_k^{(i+1)}$ are then held temporarily in buffer memory 13 prior to being either fed back into the SLM as input to another network layer or extracted as the ultimate classification result.

In FIG. 3 SLM 1 includes means for electronically inputting a weight vector or pattern. By way of example only, SLM 1 may be comprised of a liquid crystal (LC) projection display device having a plurality of pixels that are modified in response to input from, for examples a digital computer. The use of a LC projection display device enables a new input pattern or weight vector to be stored within medium 4 every, for example, 1/30th of a second. Any one of a number of spatial light modulator types may be employed. These include ferroelectric liquid crystal, twisted nematic liquid crystal, silicon membrane (deformable mirror), and magneto-optic types. In other embodiments of the invention, SLM 1 may be simply a transparent substrate having a pattern formed thereon. Two-dimensional phase encoder 2 causes the optical signal that passes through SLM 1 to be spatially distributed prior to application to medium 4. This function may be accomplished by constructing phase encoder 2 from a transparent substrate, such as glass, and providing an etched random pattern on a surface of the substrate. The linear dimension of the smallest feature of the random pattern defines the coherence length of phase encoder 2. The significance of the coherence length of the phase encoder is discussed below. Fourier transform lenses 3 and 5 are typically spherical lenses. A presently preferred volume hologram medium 4 is comprised of iron-doped lithium niobate (LiNbO$_3$:Fe). Representative dimensions of the active volume of medium 4 are one centimeter on a side. Holograms may be "permanently" fixed by heating the LiNbO$_3$:Fe to approximately 160° for approximately twenty-five minutes (see, for example, D. L. Staebler, W. J. Burk, W. Phillips, and J. J. Amodei in "Multiple storage and exposure of fixed holograms in Fe-doped LiNbO$_3$", Applied Physics Letters, Vol. 26, p.182 (1975)). Holograms fixed in such a manner are estimated to have a half-life of approximately 100,000 years at room temperature. Other suitable volume hologram media includes by example, strontium barium niobate (SrBaNbO$_3$), photorefractive photopolymers, and photochemical photopolymers. Linear detector array 6 may be, for example, a charge-coupled device (CCD), a self-scanned diode array, a Schottky diode array, a pyroelectric device array, or other device capable of converting optical photons into an electronic voltage or current. Linear detector array 6 has a resolution, or number of photoresponsive elements, equal to the number of templates stored within medium 4. Nonlinear processor 12 may be any electronic device with an appropriately shaped transfer function. Examples include digital electronic look-up tables and saturable electronic amplifiers. Buffer memory 13 may be any digital electronic memory. The output of buffer memory 13 may be fed back to SLM 1 for input to the next layer of the neural network by any suitable electrical connection well-known in the art.

Figure 4:
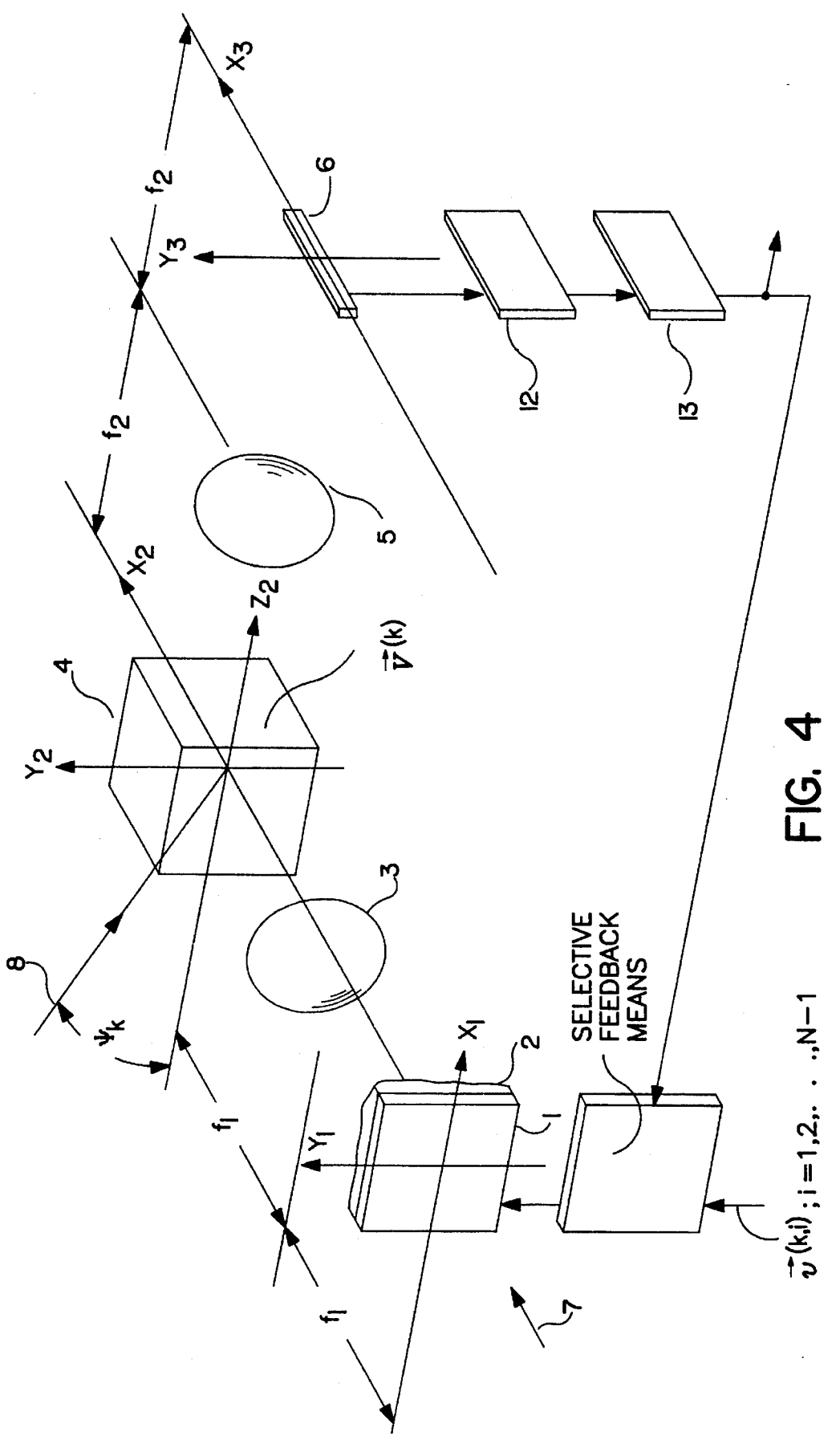
FIG. 4 is a perspective drawing of the MLOENN illustrating the storage of weight vectors $\vec{v}^{(k,i)}$, (i=1,2,..., N−1), of a sequence of K weight vectors (k=1,2,..., K)

FIG. 4 illustrates the storage of weight vectors within the medium 4. Weight vectors are stored within medium 4 in the following manner:

1. weight vectors $\vec{v}^{(k,i)}$ (i=1,2, ..., N−1) are loaded into SLM 1 using a predetermined and fixed lexicographic ordering scheme;
2. SLM 1 spatially modulates a spatially uniform, plane-wave laser beam 7;
3. phase encoder 2 multiplies the light pattern transmitted by SLM 1 by a random, two-dimensional phase encoding function;
4. first Fourier transform lens 3 (which is positioned one focal length (f$_1$) from phase encoder 2 and one focal length (f$_1$) from the midpoint of medium 4) generates (at approximately the midpoint of medium 4) the Fourier transform of the light pattern transmitted by phase encoder 2;
5. simultaneously with step (4), reference plane-wave laser beam 8 (which is temporally coherent with plane-wave laser beam 7) illuminates medium 4 at angle $\psi_k$ to the z$_2$-axis of medium 4 and within the x$_2$–z$_2$ plane; and
6. weight vector hologram V$^{(k)}$ forms within medium 4.
7. This procedure is repeated for k=1,2, ..., K until all Fourier-space holograms V$^{(k)}$ (k=1,2..., K) have been stored within medium 4.

As employed herein, a predetermined and fixed lexicographic ordering scheme is intended to mean that weight vectors are presented to the system in a consistent manner. For example, if the weight vector is derived from a television camera having a plurality of scanlines, the scanlines are input in the same order for each weight vector. The scanlines need not be input sequentially, so long as they are input consistently.

Figure 5:
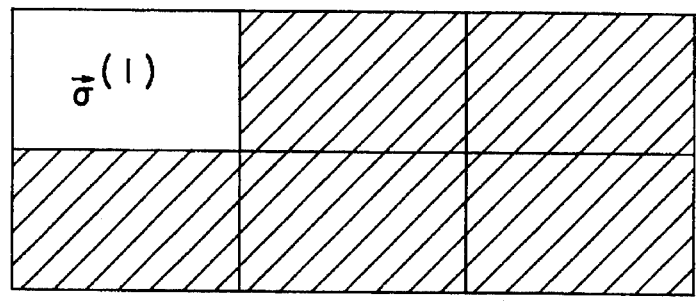
FIG. 5 depicts the spatial light modulator geometry used to store the weight vectors $\vec{v}^{(k,i)}$, i=1,2,..., (N−1).

FIG. 5 illustrates the SLM partitioning geometry used to store the weight vectors of an N-layer neural network. Since the weight vectors are, as indicated earlier, pre-selected, the k$^{th}$ rows of all N interconnect matrices R$^{(i)}$ (i=1,2, ..., N−1) may be stored simultaneously. The SLM geometry shown in FIG. 5 is capable of storing N−1 interconnect matrices, each having a maximum of K rows. Matrices having fewer than K rows may be stored by simply blocking (i.e., electronically setting to zero) the appropriate portions of the SLM.

Figure 6A:
FIGS. 6a, 6b, and 6c illustrates the spatial light modulator geometry used to sequentially process patterns $\vec{\sigma}^{(N-1)}$ (the input pattern to the neural network) through $\vec{\sigma}^{(N)}$ (the input to the Nth layer of an N-layer neural network, with FIG. 6a indicating the first loading of $\vec{\sigma}^{(1)}$ into the same portion of the SLM used to load the $\vec{v}^{(k,1)}$ (k=1,2,..., K), with FIG. 6b showing the subsequent loading of $\vec{\sigma}^{(2)}$ into the same portion of the SLM used to load the $\vec{v}^{(k,2)}$ (k=1,2,..., K), and FIG. 6c showing the loading process as continued until $\vec{\sigma}^{(N-1)}$ is loaded into the same portion of the SLM used to load the $\vec{v}^{(K,N-1)}$ (k=1,2,..., K).
Figure 6B:
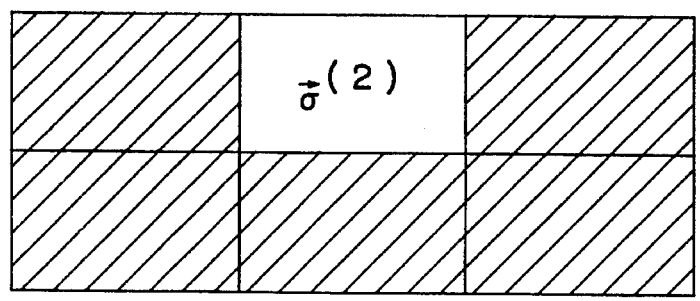
Figure 6C:
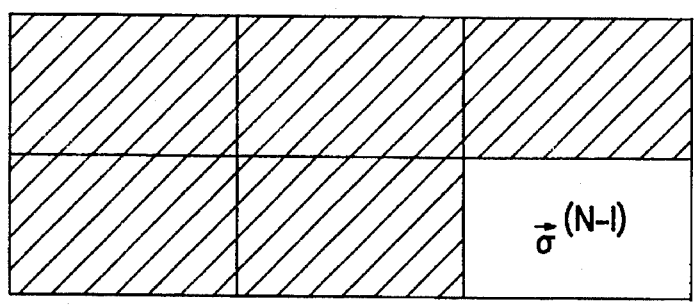

FIGS. 6a, 6b, and 6c illustrate the SLM geometry used to sequentially process patterns $\vec{\sigma}^{(1)}$ through $\vec{\sigma}^{(N-1)}$. $\vec{\sigma}^{(1)}$ (the input pattern to be classified) is first loaded into the SLM (all other regions of the SLM are electronically set to zero in order to block plane-wave laser beam 7) as shown in FIG. 6a. $\vec{\sigma}^{(2)}$ is then fetched from temporary memory 13 and loaded into the SLM as shown in FIG. 6b. The same procedure is followed until $\vec{\sigma}^{(N-1)}$ has been loaded as shown in FIG. 6c, at which time memory 13 contains the desired pattern classification results. The geometry shown in FIGS. 6a, 6b, and 6c corresponds exactly to the geometry shown in FIG. 5, i.e., $\vec{v}^{(k,1)}$ occupies the exact same physical portion of the SLM as $\vec{\sigma}^{(i)}$.

Plane-wave laser beam 7 may originate from, for example, an argon-ion laser having a wavelength of 4875 Å. The reference plane-wave laser beam 8 originates from the same source. It is also within the scope of the invention to maintain medium 4, if comprised of iron-doped lithium niobate, at a temperature of approximately 130° C. while the weight vectors are being inputted. This results in a simultaneous storing and fixing of the weight vectors. For this case, some shrinkage of medium 4 occurs when same is cooled and plane-wave laser beam 7 is required to have a slightly shorter wavelength so as to compensate for the shrinkage of the material when applying an unknown pattern to the MLOENN.

During the storage of weight vectors within medium 4, phase encoder 2 beneficially diffuses or spreads out the light energy so that the energy is uniformly distributed throughout the volume of medium 4. If phase encoder 2 were not used, the light energy from successive weight vectors would be focused to within a small region within the volume of medium 4. This would result in a reduction in storage capacity and an increase in optical crosstalk.

Also during the storage of weight vectors, the reference laser beam is scanned through a plane of medium 4. As an example, reference plane-wave laser beam 8 may be scanned through plus or minus five degrees, referenced to the center of the medium 4, in 0.01 degree increments. That is, after a weight vector is stored, reference plane-wave laser beam 8 is shifted by 0.01 degrees before the storage of a next weight vector.

FIG. 3 illustrates the generation of vector inner products $f_k^{(i)}$ (rays 9 and 10 which occurs in the following manner:

1. pattern vector $\vec{\sigma}^{(i)}$ is loaded into SLM 1 using the same pre-determined and fixed lexicographic ordering scheme used to load the $\vec{v}^{(k,i)}$;
2. SLM 1 spatially modulates plane-wave laser beam 7;
3. phase encoder 2 multiplies the light pattern transmitted by SLM 1 by a random, two-dimensional phase encoding function;
4. first Fourier transform lens 3 generates (at approximately the midpoint of medium 4) the Fourier transform of the light pattern transmitted by phase encoder 2;
5. volume hologram medium 4 generates an angular spectrum of plane waves 9 with amplitudes proportional to $\vec{v}^{(k,i)} \cdot \vec{\sigma}^{(i)}$ (k=1,2..., K) and propagation angles of $\psi_k$(k=1,2..., K) which are identical to reference plane-wave angles $\psi_k$;
6. second Fourier transform lens 5 located one focal length ($f_2$) from the midpoint of medium 4, focuses each plane wave (of the angular spectrum of plane waves) generated within volume hologram medium 4 onto linear detector array 6 located one focal length ($f_2$) from second Fourier transform lens 5;
7. inner products $f_k^{(i)}$ (corresponding to focused plane waves 10 emergent from second Fourier transform lens 5) are read out of detector array 6;
8. the output of the detector array is serially processed by nonlinear processor 12;
9. the output of nonlinear processor 12 is temporarily stored within buffer memory 13; and
10. the contents of buffer memory 13 are either read out and interpreted as classification results or fed back into SLM 1 for further, multi-layer network processing.

The above-described determination of $f_k$ (for the sake of clarity, we hereafter omit the superscript "i" denoting network layer) may be understood in greater detail by considering the electric field distributions which, under appropriate conditions, exist at various points within the MLOENN. Accordingly, referring to FIG. 7, for an electric field distribution incident on volume hologram medium 4 given by $$E^{(1)} = F\{\sigma \cdot e^{i\beta}\}, \tag{3}$$

where $\sigma$ is the two-dimensional electric field distribution which corresponds to $\vec{\sigma}$; $\beta$ is the two-dimensional phase encoding function characteristic of phase encoder 2 (see, for example, C. N. Kurtz in "The transmittance characteristics of surface diffusers and the design of nearly band-limited binary diffusers", Journal of the Optical Society of America, Vol. 62, p. 982 (1972)); and F{·} denotes Fourier transform; and for a refractive index distribution within volume hologram medium proportional to $$\sum_k [|A^k|^2 + |v^k|^2 + (A^k)^* v^k + A^k(v^k)^*], \tag{4}$$

where $A^k$ is the amplitude of reference plane-wave laser beam 8 associated with weight vector $v^k$, (·)* denotes complex conjugate, and $v^k$ is the two-dimensional field distribution given by $$v^k = F\{v^k \cdot e^{i\beta}\}; \tag{5}$$

the electric field distribution within the plane of linear detector array 6 is given by $$E^{(2)} = \sum_k \alpha^k * [(v^k \cdot e^{i\beta}) \star (\sigma \cdot e^{i\beta})], \tag{6}$$

where $\alpha^k$ is the inverse Fourier transform of $A^k$, "*" denotes convolution, and "★" denotes correlation.

Figure 7:
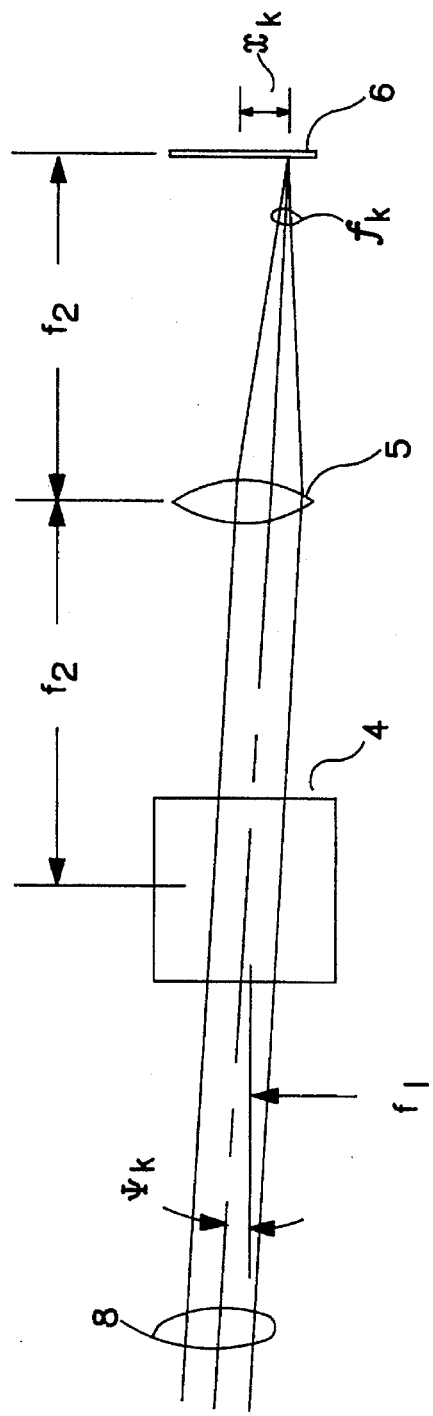
FIG. 7 is a plan view of the MLOENN illustrating the generations detection, and nonlinear processing of a single vector inner product, $f_k^{(i)}$.

Spatial filtering of $E^{(2)}$ within the plane of detector array 6 (the correlation plane) is performed both within and perpendicular to the plane of FIG. 7. The inner product is detected in the form of light energy incident on detector array 6 a distance $x_k$ from the center of array 6 (the common optical axis of lens 5 and holographic storage medium 4).

In-plane spatial filtering occurs as a natural result of Bragg selectivity within the volume hologram medium 4 (see, for example, T. Jannson, H. M. Stoll, and C. Karaguleff in "The interconnectability of neuro-optic processors", Proceedings of the International Society for Optical Engineering, Vol. 698, p.157 (1986)). Spatial filtering perpendicular to the plane of the processor occurs as a result of phase encoder 2's autocorrelation function being much narrower (~ten times) than either the autocorrelation function of $\sigma$ or any of the autocorrelation functions of the $v^k$. These spatial filtering effects yield for the field distribution within the correlation plane:

$$E^{(3)} = \sum_k \alpha^k \cdot \iint v^k \cdot \sigma d\vec{r}^2, \tag{7}$$

where the coherence length of phase encoder 2 is assumed to be significantly smaller than (e.g., less than 10% as large as) the smallest linear dimension of resolution element of either a or any of the $v^k$. The double integral in Equation (7) is taken over the correlation plane. $E^{(3)}$ may, following lexicographic ordering, be re-written as:

$$E^{(3)} = \sum_k \delta(x - x_k) \cdot [\vec{v}^k, \vec{\sigma}], \tag{8}$$

where, for reference plane-wave laser beams $A^k$, $$\alpha_k \delta(x - x_k); \tag{9}$$

$\delta(\cdot)$ is the dirac delta function; the x-dimension lies both within the correlation plane and within the plane of the holographic inner product processor; and [·,·] denotes vector inner product. Field $E^{(3)}$ represents the inner product of $\vec{\sigma}$ with each of the weight vectors $\vec{v}^k$, which is the desired result.

Although described in the context of a bulk right-angle geometry system it should be realized that the hologram geometry may be provided instead in a transmission or a reflection (Lippmann) geometry.

Figure 8:
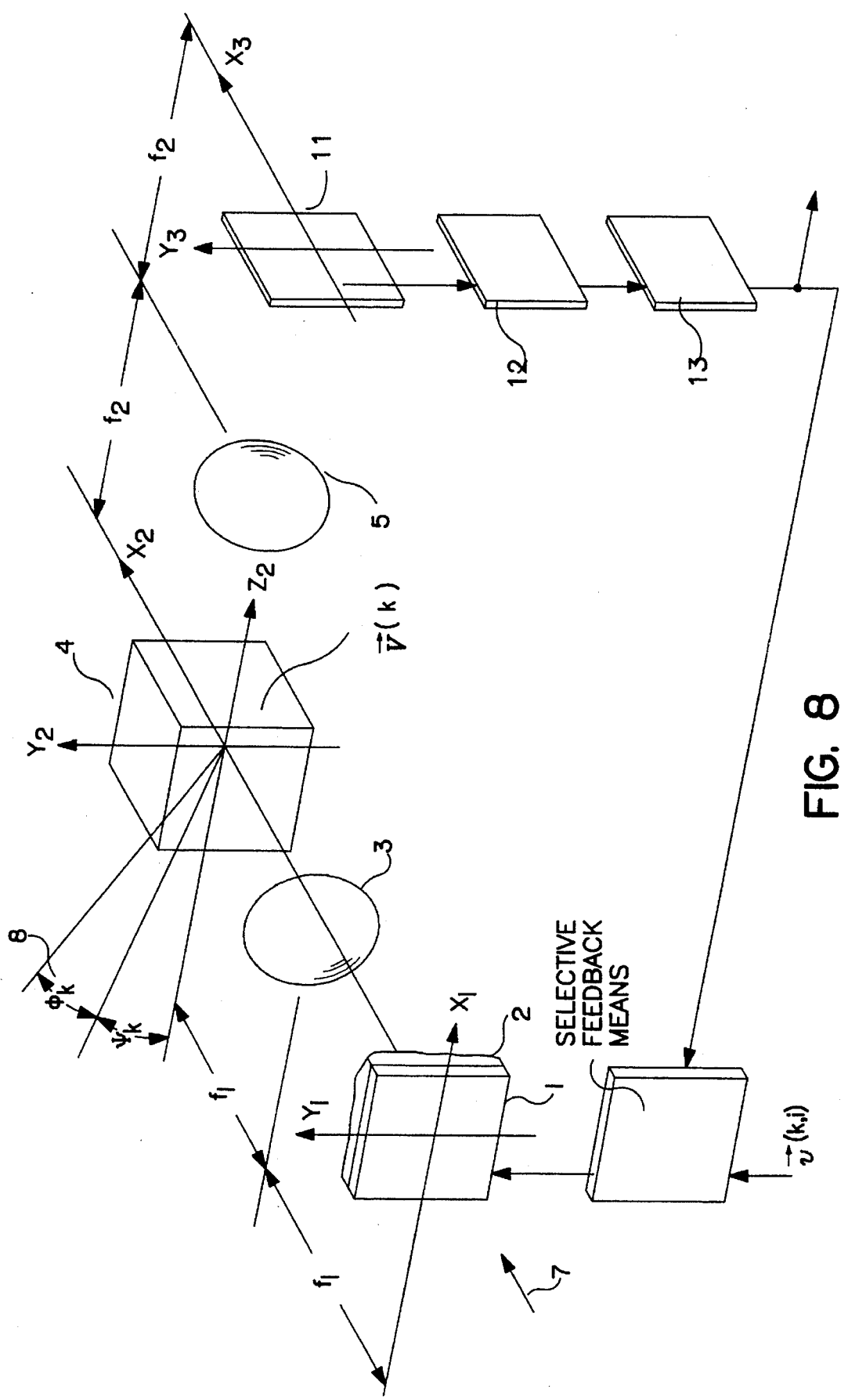
FIG. 8 is a perspective drawing of a further embodiment of an MLOENN illustrating the storage of a single weight vector $\vec{v}^{(k,i)}$ (i=1,2,..., N−1) of a sequence of weight vectors (k=1,2,..., K), this embodiment employing a reference plane-wave laser beam that is scanned in two dimensions in conjunction with a two-dimensional detector array.
Figure 9:
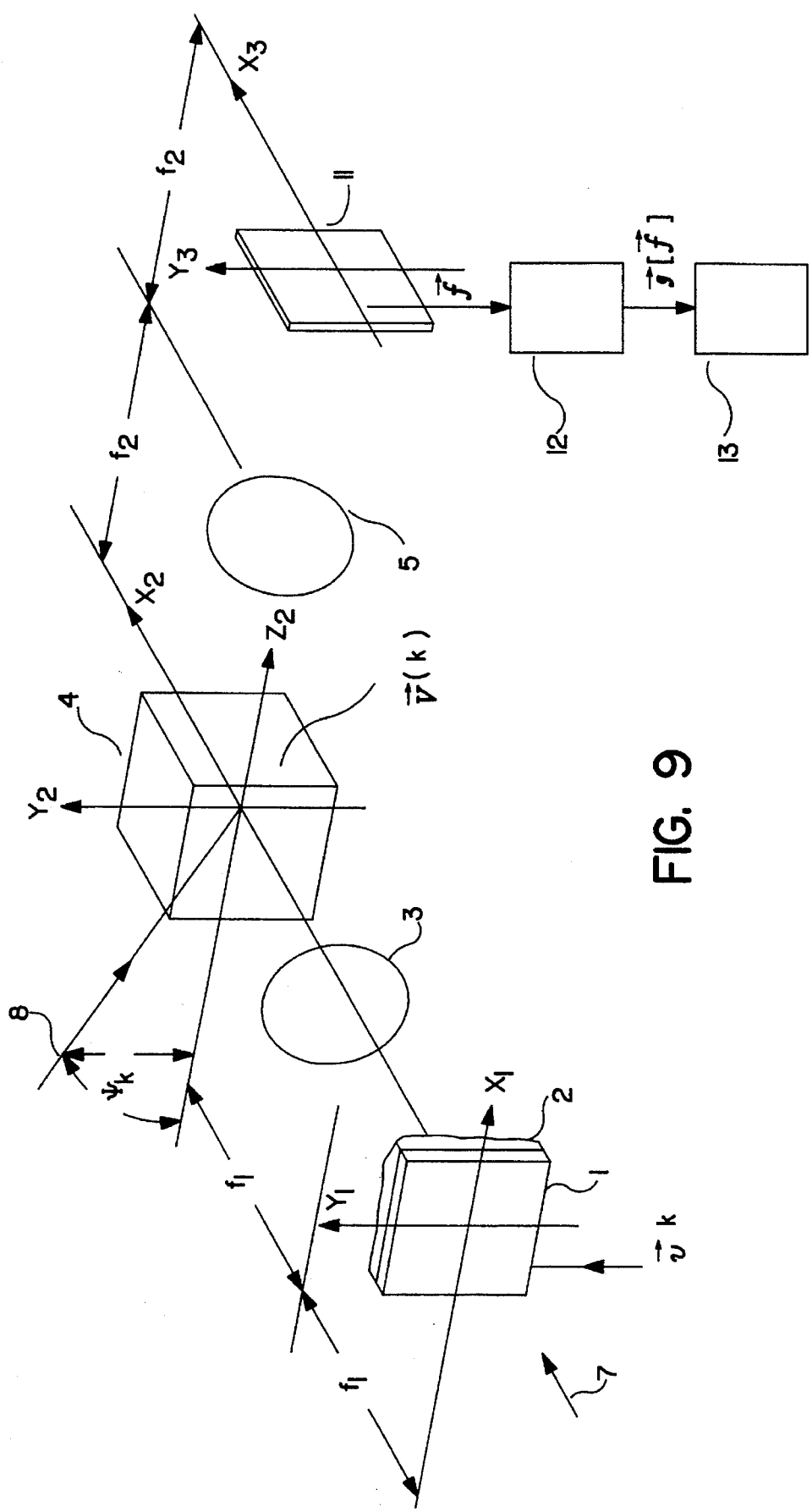

Also, although the invention has been described as using a linear array of detectors 6 disposed along the correlation plane it should be realized that, as illustrated in FIG. 8, a two-dimensional detector array 11 may be employed for a system that scans, during weight vector storage, reference laser beam 8 in two dimensions. The two-dimensional detector array 11 may then be a staring type array. In this case, fractal storage geometry considerations are employed to select reference laser beam 8 angles, $\psi_k$ and $\Phi_k$, so as to avoid crosstalk within medium 4.

This invention has been described in conjunction with the illustrative embodiments enumerated above. It will be evident to those skilled in the art that various alterations, modifications, and variations may be made to the illustrative embodiments without departing from the spirit and scope of the claims appended hereto. For these reasons, this invention is not to be construed as being limited to only the illustrative embodiments, but should only be construed by reference to the appended claims.

What is claimed is:

1. A multi-layer opto-electronic neural network (MLOENN) pattern classification apparatus, comprising:
    a volume holographic medium having a plurality of Fourier-space volume holograms representing neural network weight vectors stored within;
    means, having an output optically coupled to said medium by a first Fourier transform lens means, for spatially modulating a spatially uniform laser beam in accordance with an unknown pattern;
    means, having an input optically coupled by a second Fourier transform lens means to an angular spectrum of plane waves generated by said medium in response to the output of said spatial modulating means, for detecting plane waves that correspond to vector inner products generated within said medium in response to the unknown pattern;
    means by which the output of said detecting means are nonlinearly processed in a serial manner;
    means by which said nonlinearly processed output is temporarily stored; and
    means by which the output of said temporary storage means may be selectively read out and selectively fed back into said spatial modulating means for further processing by the MLOENN as input signals to a next layer of the MLOENN.

2. A multi-layer opto-electronic neural network (MLOENN) pattern classification apparatus as set forth in claim 1 wherein said spatial modulating means is geometrically partitioned to permit the independent storage of individual MLOENN layer weight vectors, $\vec{v}^{(k,i)}$ (i=1,2, ..., N−1; k=1,2, ..., K), and the independent excitation of individual MLOENN layers by patterns $\vec{\sigma}^{(i)}$ (i=1,2, ..., N−1) such that each $\vec{v}^{(k,i)}$ and $\vec{\sigma}^{(i)}$ occupy a same pixel of said spatial modulating means.

3. A multi-layer opto-electronic neural network (MLOENN) pattern classification apparatus as set forth in claim 1 wherein said spatial modulating means further includes means for phase encoding the spatially modulated spatially uniform laser beam in accordance with a random, two-dimensional phase encoding function.

4. A multi-layer opto-electronic neural network (MLOENN) pattern classification apparatus as set forth in claim 1 wherein said detecting means includes a linear array of photoresponsive elements disposed within and along a correlation plane of said second Fourier transform lens.

5. A multi-layer opto-electronic neural network (MLOENN) pattern classification apparatus as set forth in claim 1 wherein said nonlinear processing means has a sigmoidal transfer function with adjustable threshold and saturation points.

6. A multi-layer opto-electronic neural network (MLOENN) pattern classification apparatus as set forth in claim 5 wherein said nonlinear processing means is either an electronic look-up table or an electronic saturable amplifier.

7. A multi-layer opto-electronic neural network (MLOENN) pattern classification apparatus as set forth in claim 1 wherein said temporary storage means is a digital electronic memory.

8. A multi-layer opto-electronic neural network (MLOENN) pattern classification apparatus as set forth in claim 1 wherein said volume holographic medium provides spatial filtering, within the correlation plane, of an electric field distribution, the spatial filtering being provided in accordance with the Bragg selectivity of said volume holographic medium.

9. A multi-layer opto-electronic neural network (MLOENN) pattern classification apparatus as set forth in claim 1 wherein said volume holographic medium is comprised of a material selected from the group consisting of iron-doped lithium niobate ($LiNbO_3$:Fe), strontium barium niobate ($SrBaNbO_3$), photorefractive photopolymers, and photochemical photopolymers.

10. A multi-layer opto-electronic neural network (MLOENN) pattern classification apparatus as set forth in claim 1 wherein said spatial light modulating means is comprised of means selected from the group consisting of ferroelectric liquid crystal devices, twisted nematic liquid crystal devices, deformable mirror devices, and magneto-optic devices.

11. A multi-layer opto-electronic neural network (MLOENN) pattern classification apparatus as set forth in claim 1 wherein said detecting means includes a two-dimensional array of photoresponsive elements.

12. A method for storing (K) Fourier-space holograms within a volume holographic medium, comprising the steps of, for K Fourier-space holograms $v^{(k,i)}$ (k=1,2, ..., N):
    loading a weight vector $\vec{v}^{(k,n)}$ into a spatial light modulator means using a predetermined and fixed lexicographic ordering scheme;
    spatially modulating a first plane-wave laser beam in accordance with the loaded weight vector;
    multiplying a light pattern transmitted by the spatial light modulator means in accordance with a random, two-dimensional phase encoding function;
    applying the phase-encoded light pattern, with a first Fourier transform lens means, to approximately a midpoint of the volume holographic medium so as to generate, at the midpoint, a Fourier transform of the phase-encoded light pattern while simultaneously applying a second plane-wave laser beam, which is temporally coherent with the first plane-wave laser beam, so as to illuminate the medium at an angle $\psi_k$ to a $z_2$-axis of the medium and within a $x_{2-z2}$ plane;
    forming a weight vector hologram $v^{(k)}$ within the medium;
    changing the angle $\psi_k$ to an angle $\psi_{(k+1)}$; and
    repeating the preceding loading, spatially modulating, multiplying, applying, forming, and changing steps for each k=1,2, ..., K until all $v^{(k)}$ have been stored in the medium.

13. A method as set forth in claim 12 and including a step of fixing the weight vector holograms within the medium, the medium being formed of $LiNbO_3$:Fe, the holograms being fixed by heating the medium to a temperature of approximately 130° C. for a period of approximately 25 minutes.

14. A method for generating vector inner products ($f_k^{(i)}$) for accomplishing pattern recognition, comprising the steps of:

loading an unknown pattern vector $\vec{\sigma}^{(i)}$ (i=1,2, ..., N) into a spatial light modulator means using a same pre-determined and fixed lexicographic ordering scheme that was initially employed to store a weight vector $\vec{v}^{(k,i)}$ (k=1,2, ..., K; i=1,2, ..., N) template into a volume holographic medium;

spatially modulating a first plane-wave laser beam in accordance with the unknown pattern vector;

employing a phase encoder means to multiply the spatially modulated first plane-wave laser beam by a random, two-dimensional phase encoding function;

transmitting a phase encoded light pattern representative of the multiplied spatially modulated first plane-wave laser beam from the phase encoder means to a first Fourier transform lens means;

generating within the volume holographic medium, with the first Fourier transform lens means, a Fourier transform of the phase encoded light pattern;

generating, within the volume holographic medium, an angular spectrum of plane waves having amplitudes proportional to vector inner products $\vec{\sigma}^{(i)} \cdot \vec{v}^{(k,i)}$ (k=1,2, ..., K; i=1,2, ..., N) and propagation angles of $\psi_k$ (k=1,2, ..., K) which correspond to reference angles $\psi_k$ of a plane-wave coherent optical signal;

focusing onto a detector means, with a second Fourier transform lens means, plane waves of the angular spectrum of plane waves generated within the volume holographic medium;

reading out, from the detector means, signals representing vector inner products corresponding to the plane waves focused upon the detector means;

serially and nonlinearly processing the output of the detector means;

temporarily storing the nonlinearly processed output of the detector means; feeding the temporarily stored output of the detector means back into the spatial modulating means for further neural network processing as input signals of a next pattern vector $\vec{\sigma}^{(i+1)}$ and reading out the temporarily stored output of the detector means as pattern recognition results.

* * * * *